(12) United States Patent
Brooke

(10) Patent No.: US 6,565,693 B1
(45) Date of Patent: May 20, 2003

(54) RAPID TEXTURE PROTOTYPING

(75) Inventor: Nigel Brooke, Oldham (GB)

(73) Assignee: Eschmann-Stahl GmbH & Co. KG (DE)

( * ) Notice: Subject to any disclaimer, the term of this patent is extended or adjusted under 35 U.S.C. 154(b) by 0 days.

(21) Appl. No.: 09/237,591

(22) Filed: Jan. 19, 1999

Related U.S. Application Data

(63) Continuation of application No. PCT/GB98/00065, filed on Jan. 9, 1998.

(30) Foreign Application Priority Data

Nov. 28, 1997 (GB) .............................. 9725102

(51) Int. Cl.$^7$ ............... B44C 1/165; B32B 31/20; B41M 3/12; B29C 59/00; B29C 33/40
(52) U.S. Cl. ............... 156/230; 156/239; 156/240; 156/247; 156/289; 427/146; 427/147; 427/148; 427/336; 428/195; 428/914; 264/129; 264/132; 264/220; 264/316; 264/340
(58) Field of Search ............... 156/230, 231, 156/233, 236, 238, 239, 240, 241, 242, 247, 277, 289, 61; 427/146, 147, 148, 149, 336; 428/195, 914, 915; 430/33; 264/132, 129, 133, 220, 313, 229, 340, 316, 293, 257, 266, 275

(56) References Cited

U.S. PATENT DOCUMENTS

| | | | | |
|---|---|---|---|---|
| 2,556,504 A | * | 6/1951 | Prestwich | 264/213 |
| 2,984,596 A | * | 5/1961 | Franer | 428/41.6 |
| 3,434,861 A | * | 3/1969 | Luc | 427/264 |
| 3,607,526 A | * | 9/1971 | Biegen | 456/235 |
| 3,723,584 A | | 3/1973 | Nussbaum | |
| 3,791,905 A | | 2/1974 | Molner | 156/235 |
| 3,936,554 A | * | 2/1976 | Squire | 428/88 |
| 4,308,310 A | * | 12/1981 | Arnold et al. | 428/195 |
| 4,490,410 A | | 12/1984 | Takiyama et al. | 427/44 |
| 4,983,487 A | * | 1/1991 | Gilreath | 430/126 |
| 5,047,103 A | * | 9/1991 | Abrams et al. | 156/72 |
| 5,171,392 A | * | 12/1992 | Iida et al. | 156/273.3 |
| 5,182,063 A | | 1/1993 | Lang et al. | |
| 5,427,890 A | * | 6/1995 | Suzuki et al. | 430/263 |
| 5,483,890 A | | 1/1996 | Kildune | 101/401.1 |
| 5,492,663 A | * | 2/1996 | Greenwald et al. | 264/154 |
| 5,504,144 A | * | 4/1996 | Dorpfeld et al. | 524/588 |
| 5,527,407 A | * | 6/1996 | Gartland et al. | 156/64 |
| 5,639,536 A | * | 6/1997 | Yamazaki et al. | 428/141 |
| 6,251,208 B1 | * | 6/2001 | Serizawa et al. | 156/232 |

FOREIGN PATENT DOCUMENTS

| | | | | |
|---|---|---|---|---|
| DE | 3536301 A1 | 10/1985 | | |
| DE | G9404567.4 | 3/1994 | | |
| EP | 0-363-111 | 4/1990 | | |
| EP | 0 400 672 | 12/1990 | | |
| EP | 0 668 136 | 8/1995 | | |
| FR | 2 631 861 | 12/1989 | | |
| GB | 2 246 536 | 2/1992 | | |
| GB | 2259883 A | * | 3/1993 | B29C/33/42 |
| JP | 57140116 | 8/1982 | | |
| WO | WO-91/08096 | * | 6/1991 | |
| WO | WO 98 15372 | 4/1998 | | |
| WO | WO 99 03662 | 1/1999 | | |
| WO | WO 99 28113 | 6/1999 | | |

OTHER PUBLICATIONS

Grobholz, H.; "NASE VORN," Technishe Rundschau, CH, Hallwag Verlag. Bern, vol. 87, No. 41; Oct. 13, 1995; p. 47.

\* cited by examiner

Primary Examiner—J. A. Lorengo
(74) Attorney, Agent, or Firm—Wallenstein & Wagner, Ltd.

(57) ABSTRACT

There is disclosed a method for simulating a mould-imparted texture including applying a textured skin to a moulding from a pre-textured mould.

15 Claims, 2 Drawing Sheets

RAPID TEXTURE PROTOTYPING

This application is a continuation of International Application No. PCT/GB98/00065, filed Jan. 9, 1998, now pending (which is hereby incorporated by reference).

DESCRIPTION

Technical Field

This invention relates to rapid texture prototyping for moulded articles.

BACKGROUND OF THE INVENTION

Many moulded articles are made with a textured surface finish. Examples include interior trim parts for automobiles, knobs and handles for cooking utensils, garden furniture, casings for audio and video equipment, computers and calculators, and so on. Many of these items are made from large, expensive moulds. The moulds are first made with a smooth moulding cavity which must then be etched to produce the texture. Etching is done by applying a resist and immersing the mould in acid etchant.

Once etched, it will usually be impossible, or at best highly impracticable, to expunge the texture and apply a different texture. It is vital, therefore, for a designer to have some idea of how the product will look, textured. To this end, computer simulations are proposed in which the item can be imaged to a screen using CAD techniques and a texture superimposed. No matter to what state of excellence this type of simulation can be raised, however, it still cannot give the designer a textured component to build into a prototype assembly of, say, an automobile.

SUMMARY OF THE INVENTION

The present invention provides for rapid prototyping for textured-surface moulded articles giving authentic pre-appreciation of both appearance and feel.

The invention comprises a method for simulating a mould-imparted texture comprising applying a textured skin to a moulding from a pre-textured mould.

The skin may comprise a skin layer with relief material attached thereto as a texture. The skin layer may constitute a release backing peeled off the moulding after application of the relief material thereto. The relief material may be preferentially adhered to the moulding to enable peel off of the release backing.

However, the skin layer may be soluble and be dissolved after the relief material is adhered to the moulding. The skin layer may be soluble in a paint which is applied after application to the moulding—the skin layer then becomes absorbed into the paint layer.

The skin may be burnished on to the moulding—this may be done before and/or after removal of the skin layer; if done before, burnishing serves the purpose of improving adhesion to the moulding and helping to smooth out any imperfections in application. Burnishing may be effected by a densely-bristled brush, though other burnishing tools may be found more appropriate to specific patterns.

As to patterns, the texture may be a random pattern texture, such as the popular leather and woodgrain finishes. A textured skin suitable for such finishes is commercially available glass engraving resist, in which a resist pattern is carried on a release sheet for application to a glass surface which is then sand blasted, the glass surface being eroded except beneath the resist which is then removed. In the present application, the resist material becomes part of the textured surface of the moulding.

The method of the invention is particularly advantageous, however, with geometric patterns used as texture. Such patterns can be readily created by a CAD arrangement which can control a cutting arrangement to cut the pattern into sheet material e.g. vinyl plastics sheeting. Such sheeting may be presented (in different thickness) on a release backing from which cut sheet may be separated, by differential bonding, on to a separate release sheet—there being then 'positive' and 'negative' versions of the pattern. Either release sheet then forms the skin layer of the textured skin.

Whilst the overall effect of a random—leather, woodgrain etc—pattern may be visualizable by skilled designers, the way a regular geometric pattern texture sits on a curved surface is less easy to imagine. Indeed, difficulties are experienced in engraving even moderately complicated moulds with geometric pattern textures as a resist-carrying backing sheet usually has to be creased to fit the mould. Often, a regular geometric texture simply cannot be applied because of the difficulties of engraving the mould, this explaining a preponderance of random textures, principally leathers.

However, for prototyping purposes as disclosed herein, the skin may be arranged to be stretchable to fit without creasing on to the moulding and the texture is imparted to the skin (as by a CAD arrangement) in distorted fashion to compensate for skin stretching to fit the moulding. Once perfected and approved, Me same technique can then be used to make a stretchy resist for application to the mould from which the moulding was taken. It is possible to take several—indeed as may as may be required mouldings from the untextured mould for perfection of a pattern and for investigation of the visual and tactile effects of different texture patterns or different orientations of a single pattern.

BRIEF DESCRIPTION OF THE DRAWINGS

Methods for simulating texture according to the invention will now be described with reference to the accompanying drawings, in which.

BRIEF DESCRIPTION OF THE PREFERRED EMBODIMENT

The drawings illustrate methods for simulating a mould-imparted texture comprising a textured skin 11 applying to a moulding 12 from a pre-textured mould 13.

The mould 13 comprises a mould cavity 13*a* and a cooperating former 13*b*. When first made the mould cavity is smooth-walled. For aesthetic reasons—as well as to conceal surface imperfections—or to provide grip (e.g. knurling on knobs, ribs on canister caps and so forth) it is usually intended that the visible surface (in the finished or assembled product of which the moulding is a component) is provided with a texture, which might be a random texture such as that of leather or woodgrain, or a regular geometric texture such as raised (or indented) cylindrical, square, diamond or other shaped areas arranged in a pattern.

The texture is applied to the mould surface by acid etching using a resist. This is a procedure that does not usually allow of second thoughts and there is a strong desire on the part of the designers to be able to visualize the finished product before the final step necessary to produce that product— namely the application of a textured finish to the mould wall—has been finally and irrevocably carried out.

To this end, according to the invention, a preferred texture or a selection of preferred textures is made from a library or designed from scratch using, for example, a CAD system. A moulding 12 is made from the pre-textured mould 13, or as many mouldings as there are textures to assess.

Figure 1:
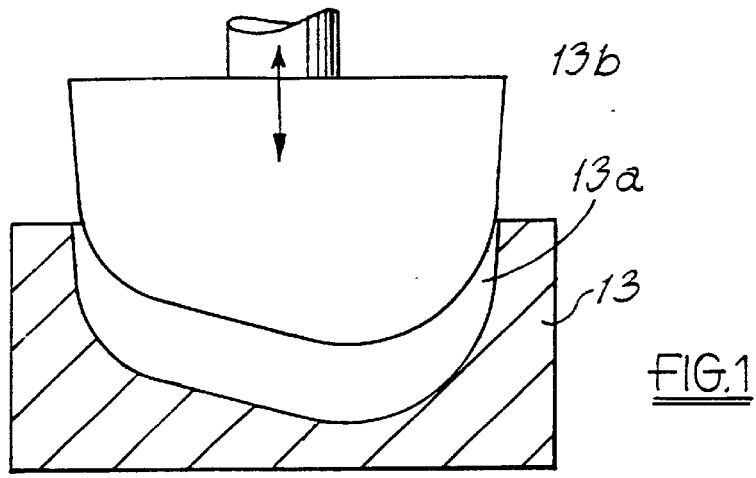
FIG. 1 is a diagrammatic cross-section through a mould.
Figure 2:
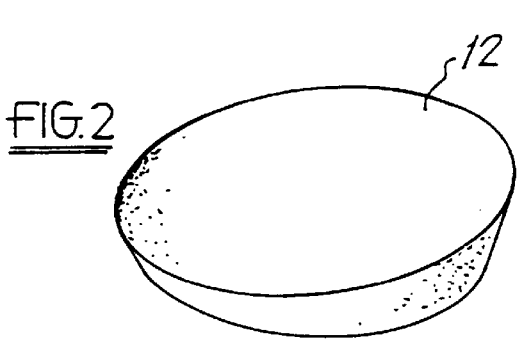
FIG. 2 is a view of a moulding made using the mould of FIG. 1.
Figures 3, 4:
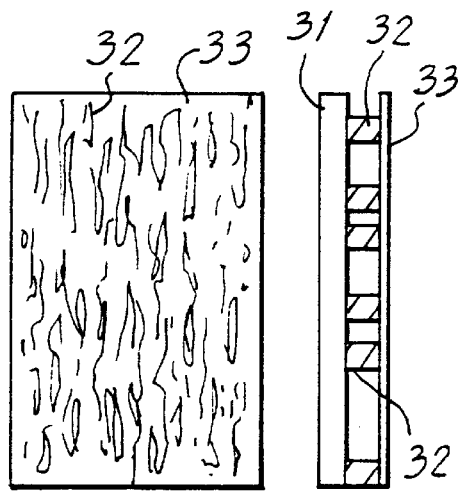
FIG. 3 is a face-on-view of a textured skin layer to be applied to the moulding of FIG. 2.
FIG. 4 is a cross-section through the textured skin applying layer of FIG. 3, much enlarged.
Figure 5:
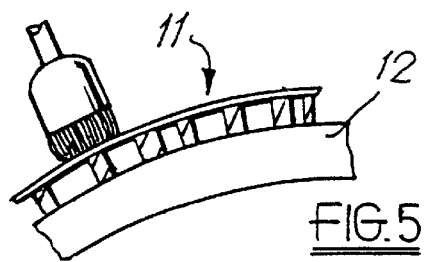
FIG. 5 is a cross-section through part of the surface of the moulding of FIG. 2, with the skin from FIGS. 3 and 4 in place, and showing burnishing.

FIG. 3 and 4 illustrate a commercially available product that just happens to be suitable for use in the method. This product is known as glass engraving resist and is used in engraving glass by sandblasting. It comprises a protective backing 31 covering a pattern 32 on a film 33. The pattern 32 is releasably adhered to the backing 31. With this stripped off the pattern 32 is applied to a glass surface, in its regular use, having been first sprayed with an adhesive if necessary, to adhere to the glass while the film 33 is peeled off. The pattern material 32 protects the underlying glass from erosion by the sand particles and is later washed off.

Using this product in the present invention, the backing 31 is removed and the pattern material 32 is applied to the surface of the moulding 12, if necessary spraying the moulding 12 or the pattern material with a suitable adhesive. The film 33 and pattern material may now be securely pressed on to the moulding 12 as by burnishing—a brush 51 with densely packed bristles is an effective burnishing tool.

Figure 6:
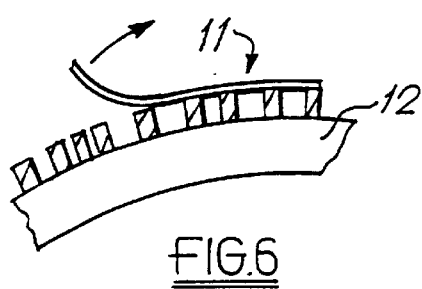
FIG. 6 is a cross-section like FIG. 5, showing peeling off a skin layer.
Figure 7:
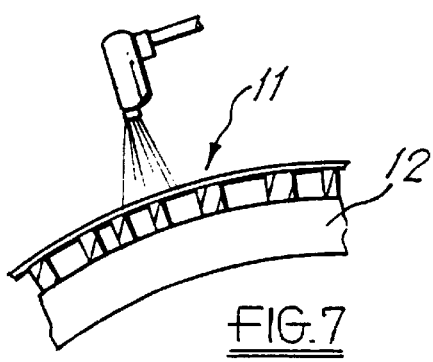
FIG. 7 is a cross-section like FIG. 5, showing painting over a soluble skin layer.

Further, now, the film 33 is peeled off, as seen in FIG. 6, for which it must be less well adhered to the pattern material 32 than the latter is to the moulding 12, or, if the material of the film is soluble in a suitable paint, such a paint is now sprayed on to the film 33 (FIG. 7) which dissolves the film leaving the contours of the pattern material 32 covered with a uniform paint layer as a seemingly integral texture to the moulding 12.

It is desirable, in any event, to paint the surface now textured even if the film 33 is removed—it is a texture which is desired to be simulated, and uniformly coloured surface is appropriate.

Being a commercial product for an entirely different purpose, it cannot be expected that a full range of textures appropriate to entirely different circumstances would be available, nor that such a product could be available in bespoke designs, especially considering that, as used in the method taught herein, it is, not a consumable of production, merely an adjunct to design. However, a wide, indeed practically limitless variety of designs can be readily produced using a CAD system, especially for geometric texture patterns. Basically, a CAD-produced design is used to cut a design out of sheet material, such as vinyl plastic sheet which may be supplied in roll form in a range of thicknesses, a thickness being selected according to the depth of relief required in the finished textured surface. The vinyl is cut to the required pattern while on a release backing and can be separated by the application of another release, or simply by peeling off from the backing a matrix out of which "islands" have been cut, leaving "positive" and "negative" patterns.

A problem with geometric pattern is that in a mould which has curvature in two directions, it is impossible to fit a pattern without cutting darts in the resist, and the same will be true of the simulation according to the invention.

Figure 8:
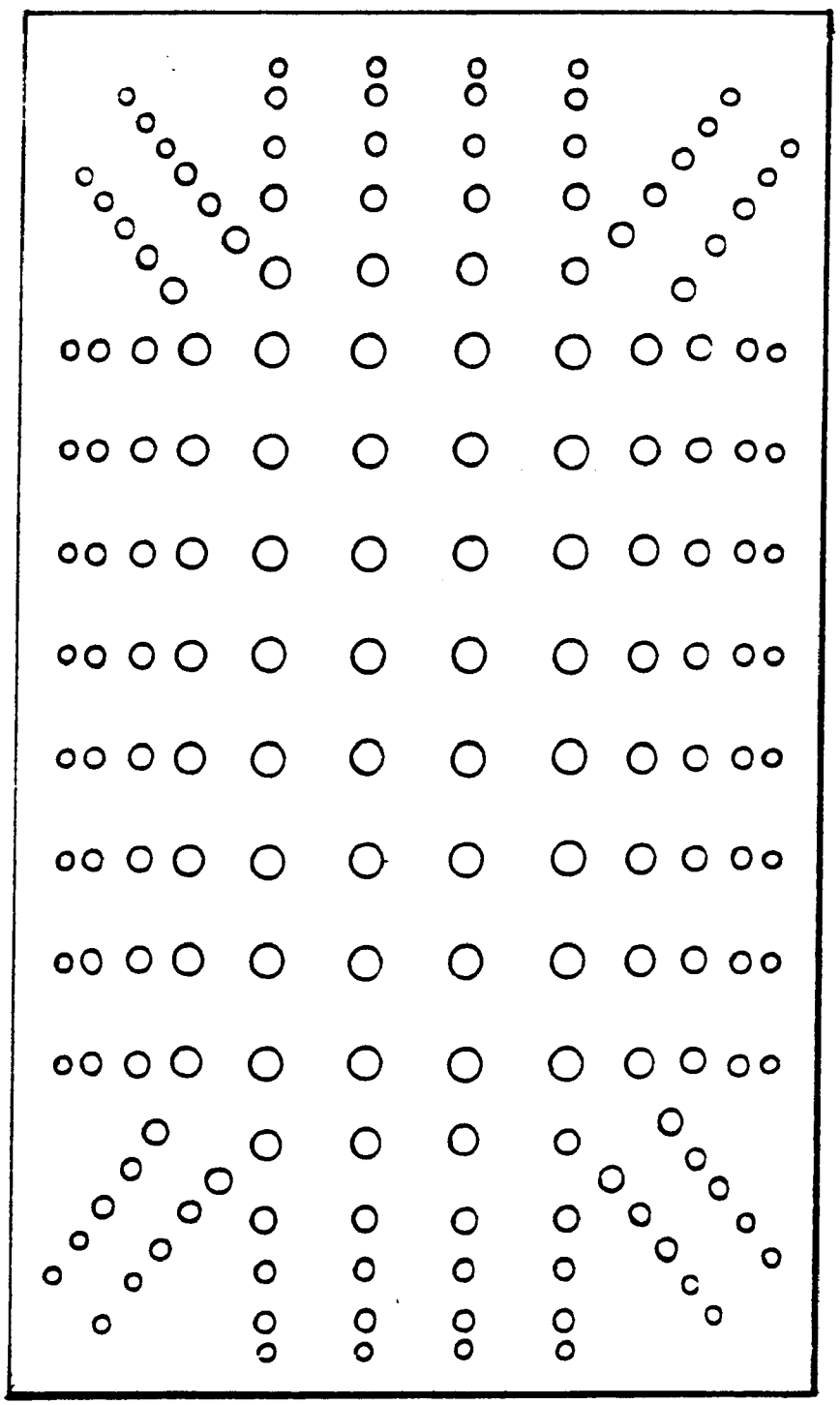
FIG. 8 is a face-on-view of a textured skin applying layer of a geometric texture pattern.

Using cad techniques, however, it will be possible to produce a distorted pattern, such as that seen in FIG. 8 which can be based on biaxially orientable film and stretched appropriately to fit the moulding (when simulating) or the mould (when etching the mould) to compensate for the curvatures and yield a regular, well oriented texture pattern.

What is claimed is:

1. A method of prototyping a moulded article by simulating appearance and feel of a textured moulding comprising the steps of:

providing a pre-textured moulding from a mould;

applying a skin layer to the moulding after the moulding is formed, the skin layer having a textured relief material and a release backing;

removing the release backing from the textured relief material while the textured relief material remains on the moulding to form the textured moulding; and, applying a uniform paint layer to the textured moulding.

2. A method according to claim 1, in which the textured relief material is preferentially adhered to the moulding to enable peel off of the release backing.

3. A method according to claim 1, in which the release backing is soluble and is removed by dissolving after the textured relief material is adhered to the moulding.

4. A method according to claim 3, in which the release backing is soluble in a paint which is applied after application of the textured relief material to the moulding.

5. A method according to claim 1, in which the skin layer is burnished onto the moulding.

6. A method according to claim 1, in which the textured relief material is a random pattern texture.

7. A method according to claim 6, in which the textured relief material is a leather texture.

8. A method according to claim 6, in which the textured relief material is a woodgrain texture.

9. A method according to claim 6, in which the textured relief material is a glass engraving resist.

10. A method according to claim 6, in which the textured relief material is a geometric pattern texture.

11. A method according to claim 10, in which the geometric pattern is cut from sheet material, and the cut pattern transferred from a release backing of the sheet material to the skin layer.

12. A method according to claim 1, in which the skin layer is stretchable to fit without creasing onto the moulding and the textured relief material is imparted to the skin layer in a distorted fashion to compensate for the skin layer stretching to fit the moulding.

13. A method according to claim 12, also used to make a resist for application to the mould.

14. A method of prototyping by simulating appearance and feel of a textured moulding comprising the steps of:

providing a pre-textured moulding from a mould;

providing a skin layer having a textured relief material attached thereto, the skin layer further comprising a release backing;

applying the relief material to the moulding; and, dissolving the skin layer from the relief material.

15. A method of prototyping by simulating appearance and feel of a textured moulding produced from a textured mould comprising the steps of:

providing a pre-textured moulding from a mould;

providing a skin layer having a textured relief material attached thereto, the skin layer further comprising a release backing;

applying the relief material to the moulding; and, applying a paint to the skin layer to dissolve the skin layer.

* * * * *